(12) United States Patent
Yang et al.

(10) Patent No.: US 12,320,435 B2
(45) Date of Patent: Jun. 3, 2025

(54) AUTOMATIC EXHAUST VALVE

(71) Applicant: Knorr-Bremse Braking Systems for Commercial Vehicles (Dalian) Co., Ltd., Dalian (CN)

(72) Inventors: Yansong Yang, Shanghai (CN); Yijun Shi, Shanghai (CN)

(73) Assignee: Knorr-Bremse Braking Systems for Commercial Vehicles (Dalian) Co., Ltd., Dalian (CN)

(*) Notice: Subject to any disclaimer, the term of this patent is extended or adjusted under 35 U.S.C. 154(b) by 19 days.

(21) Appl. No.: 18/228,072

(22) Filed: Jul. 31, 2023

(65) Prior Publication Data
US 2024/0102563 A1 Mar. 28, 2024

(30) Foreign Application Priority Data
Jul. 29, 2022 (CN) .......................... 202221985731.2

(51) Int. Cl.
*F16K 15/04* (2006.01)
*F16K 27/02* (2006.01)

(52) U.S. Cl.
CPC ........ *F16K 15/044* (2013.01); *F16K 27/0209* (2013.01)

(58) Field of Classification Search
None
See application file for complete search history.

(56) References Cited

U.S. PATENT DOCUMENTS

| 701,754 A | 6/1902 | Moran | |
|---|---|---|---|
| 3,050,080 A | * 8/1962 | Pagano | ..................... F16K 1/14 188/352 |
| 3,293,995 A | * 12/1966 | Smith | ................... F15B 21/044 91/422 |

(Continued)

FOREIGN PATENT DOCUMENTS

| CN | 204312795 U | 5/2015 |
|---|---|---|
| FR | 2 492 941 A1 | 4/1982 |

OTHER PUBLICATIONS

Extended European Search Report issued in European Application No. 23188110.3 dated Dec. 1, 2023 (9 pages).

*Primary Examiner* — Matthew W Jellett
(74) *Attorney, Agent, or Firm* — Crowell & Moring LLP

(57) ABSTRACT

In the field of automobile steering gear manufacturing, an automatic air-discharge valve is provided having a valve body, a valve seat, a steel ball and a pressure regulation spring. The valve body is externally connected to a piston. The valve body is internally provided with an air-discharge channel having various diameters which is capable of accommodating the valve seat, the pressure regulation spring and the steel ball. The steel ball may be accommodated in the middle of the air-discharge channel of the valve body. A pressure regulation spring is arranged on left and right sides of the steel ball. The pressure regulation spring comprises a left spring and a right spring, one end of the left spring being supported by the valve body and the other end thereof being supported by the steel ball, and one end of the right spring being supported by the valve seat, and the other end thereof being supported by the steel ball. The valve seat is installed at a bottom of the valve body, and a valve seat air-discharge hole is provided in the middle of the valve seat.

11 Claims, 2 Drawing Sheets

(56) References Cited

U.S. PATENT DOCUMENTS

| | | | |
|---|---|---|---|
| 3,456,442 A | | 7/1969 | Brooks |
| 3,489,172 A | | 1/1970 | Whitmore |
| 3,734,115 A | * | 5/1973 | McMath ................. F16K 17/30 |
| | | | 137/75 |
| 3,861,414 A | | 1/1975 | Peterson, II |
| 5,921,271 A | | 7/1999 | Thomas et al. |
| 5,950,670 A | * | 9/1999 | Flaim .................... F16K 17/196 |
| | | | 137/515.7 |
| 2006/0272717 A1 | * | 12/2006 | Agrawal ............... F16K 15/044 |
| | | | 137/881 |
| 2010/0116364 A1 | * | 5/2010 | Koyama ............... F16K 15/044 |
| | | | 137/535 |

\* cited by examiner

AUTOMATIC EXHAUST VALVE

BACKGROUND AND SUMMARY

The present utility model relates to the technical field of automobile steering gear manufacturing, and in particular to an automatic air-discharge valve.

Power steering gears require a hydraulic drive, and hydraulic fluid often contains air. The presence of air in a hydraulic steering system would cause a series of disadvantages such as abnormal sound, noise, and difficulties in steering.

As in the Chinese Patent No. CN 204312795, an automatic air-discharge valve is introduced by most power steering gear manufacturers to assist in air discharge. Since a piston is generally used as a boundary in a steering gear to divide a steering gear housing into two oil chambers, different high and low pressure states of the two oil chambers correspond to power steering requirements in different directions. The automatic air-discharge valve as in the Chinese Patent No. CN 204312795 is installed on a piston and communicates two oil chambers. However, when oil pressures in the two oil chambers are the same or only slightly different (generally during straight travel), due to the limitations of the structure of this type of automatic air-discharge valve, the oil pressures are unable to overcome a spring force to separate a steel ball from a valve seat (cover ring). As a result, the automatic air-discharge valve remains in a closed state, and air cannot pass through and be discharged.

In order to enable an air discharge function, it is necessary to increase the pressure difference between the two chambers, overcoming the spring force that keeps the steel ball pressing against the valve seat (cover ring) to separate the steel ball from the valve seat. However, an excessive pressure difference causes the steel ball to seal against a valve body at the other end. Therefore, the automatic air-discharge valve as in the Chinese Patent No. CN 204312795 can only discharge air in the case of the pressure difference being greater than a certain pressure A (A>0) and less than a certain pressure B (referred to as a valve closing pressure in the Chinese Patent No. CN 204312795). This makes it impossible to discharge air in case that the pressure difference between the two hydraulic chambers is close to 0 when the vehicle is driving on a long straight road. In order to solve this problem and ensure sufficient time for air discharge, the pressure B must be properly increased. However, the process of air discharge through the air-discharge valve also involves an internal leakage in the two oil chambers, which impairs the performance of the steering gear. For a driver, the sensitivity of steering at a low pressure is an important part of the driving experience. If there is an excess leakage under a low pressure condition, the steering sensation would be dull. That is, the higher the pressure B, the more the driving experience is affected.

In view of the foregoing, an automatic air-discharge valve is provided.

The purpose of this section is to outline some aspects of the embodiments of the present utility model and briefly introduce some preferred embodiments. Some simplifications or omissions may be made in this section as well as the abstract and the title of the present application to avoid obscuring the purpose of this section, the abstract and the title, and such simplifications or omissions are not intended to limit the scope of the present utility model.

In view of the problems existing in the prior art, the present utility model is proposed.

Accordingly, an objective of the present utility model is to provide an automatic air-discharge valve, which improves internal leakage at a low pressure, thus improving the mechanical property of a steering gear at the low pressure, enhancing the sensitivity of the steering gear and obtaining better driving experiences.

In order to solve the technical problem described above, according to an aspect of the present utility model, the present utility model provides the following technical solution.

An automatic air-discharge valve is provided, comprising a valve body, a valve seat, a steel ball, and a pressure regulation spring; wherein the valve body is externally connected to a piston, and the valve body is internally provided with an air-discharge channel having various diameters which is capable of accommodating the valve seat, the pressure regulation spring and the steel ball; the steel ball may be accommodated in the middle of the air-discharge channel of the valve body; a pressure regulation spring is arranged on left and right sides of the steel ball, and the pressure regulation spring comprises a left spring and a right spring, one end of the left spring being supported by the valve body and the other end thereof being supported by the steel ball, and one end of the right spring being supported by the valve seat, and the other end thereof being supported by the steel ball; and the valve seat is installed at a bottom of the valve body, and a valve seat air-discharge hole is provided in the middle of the valve seat.

In a preferred solution of the automatic air-discharge valve according to the present utility model, a surface of the steel ball in contact with a surface arranged at either end of the air-discharge channel can provides a sealing effect.

In a preferred solution of the automatic air-discharge valve according to the present utility model, when there is no pressure difference or a small pressure difference between two hydraulic chambers of a power steering gear, the steel ball is in the middle, and air keeps being discharged.

In a preferred solution of the automatic air-discharge valve according to the present utility model, the stiffness of the pressure regulation spring is adjustable to obtain different closed pressures.

In a preferred solution of the automatic air-discharge valve according to the present utility model, the valve body is externally provided with a connecting thread fitting with a connected member.

In a preferred solution of the automatic air-discharge valve according to the present utility model, the valve body is externally provided with a screwdriver groove to facilitate installation.

In a preferred solution of the automatic air-discharge valve according to the present utility model, the valve body is fixed to the valve seat by riveting.

In a preferred solution of the automatic air-discharge valve according to the present utility model, the valve body is capable of discharging air in two directions.

In a preferred solution of the automatic air-discharge valve according to the present utility model, the valve body further comprises a valve body air-discharge hole, a valve body sealing chamfer, a valve body-valve seat mating surface, a steel ball travel channel, and a valve body riveting portion; and the valve seat further comprises a valve seat sealing chamfer and a valve seat-valve body mating surface which mate with the valve body.

Compared with the prior art, the present utility model has the beneficial effects that the problem that the existing automatic air-discharge valves require an opening pressure in order to discharge air is solved, such that a power steering gear can discharge air in a low-pressure range, thereby improving the mechanical property of a steering gear at a low pressure, enhancing the sensitivity of the steering gear and obtaining better driving experiences.

In order to more clearly explain the technical solutions of embodiments of the present utility model, the present utility model will be described in detail below with reference to the accompanying drawings and detailed description. Obviously, the accompanying drawings in the following description show merely some embodiments of the present utility model, and those of ordinary skill in the art may still derive other drawings from these accompanying drawings without involving any inventive efforts.

In the following description, numerous specific details are set forth in order to fully understand the present utility model, however, the present utility model can be implemented in other ways different from those described herein, a person skilled in the art can make similar extensions without departing from the connotation of the present utility model, and therefore the present utility model is not limited to the specific embodiment disclosed below.

Furthermore, the present utility model is described in detail with reference to schematic diagrams. When the embodiments of the present utility model are described in detail, in order to facilitate explanation, the cross-sectional views illustrating the structure of a device may be partially enlarged and not be drawn to a general scale. Moreover, the schematic diagrams are merely examples and should not limit the scope of protection of the present utility model. In addition, the three-dimensional dimensions, i.e., length, width and depth, should be included in an actual manufacturing.

DETAILED DESCRIPTION OF THE DRAWINGS

The present utility model provides the following technical solution: an automatic air-discharge valve improves internal leakage at a low pressure, thus improving the mechanical property of a steering gear at the low pressure, enhancing the sensitivity of the steering gear and obtaining better driving experiences.

Embodiment 1

Figure 1:
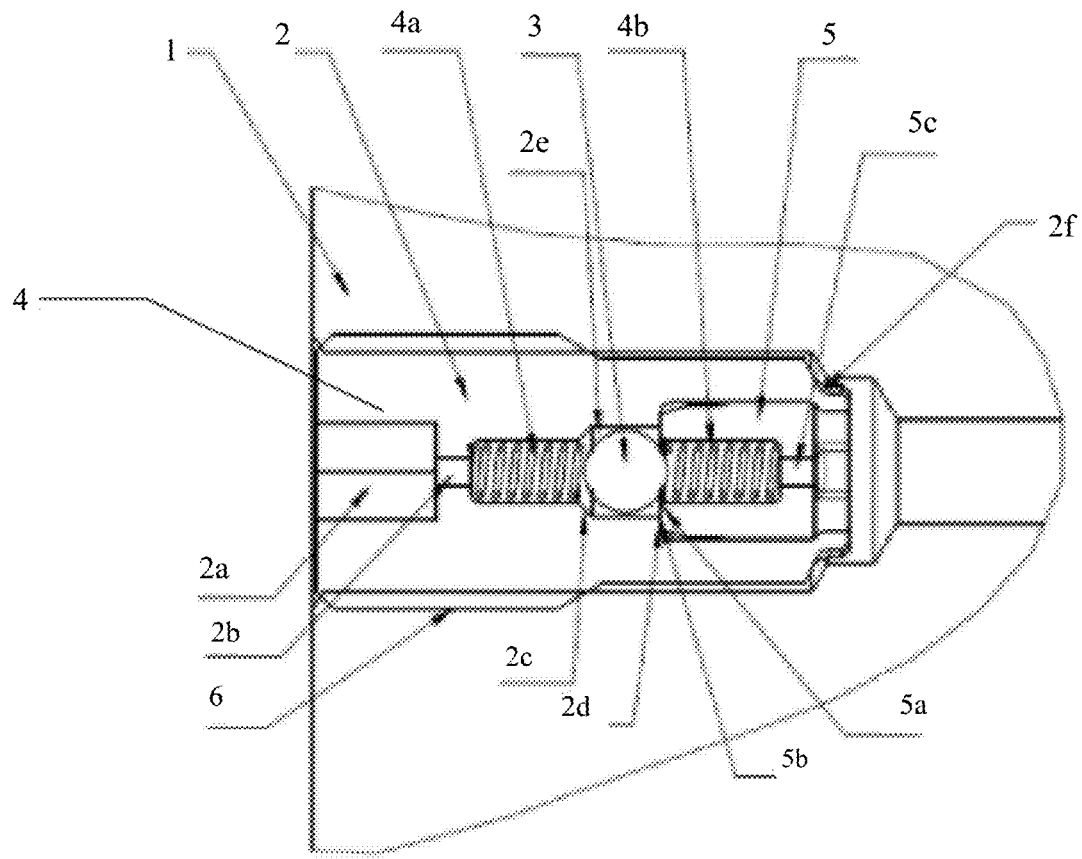
FIG. 1 is a schematic diagram of the structure of the present utility model.
Figure 2:
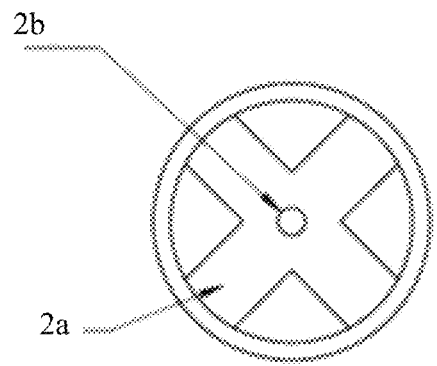
FIG. 2 is a schematic side view of the structure of the present utility model, as well as a cross section through a portion thereof.
Figure 2:
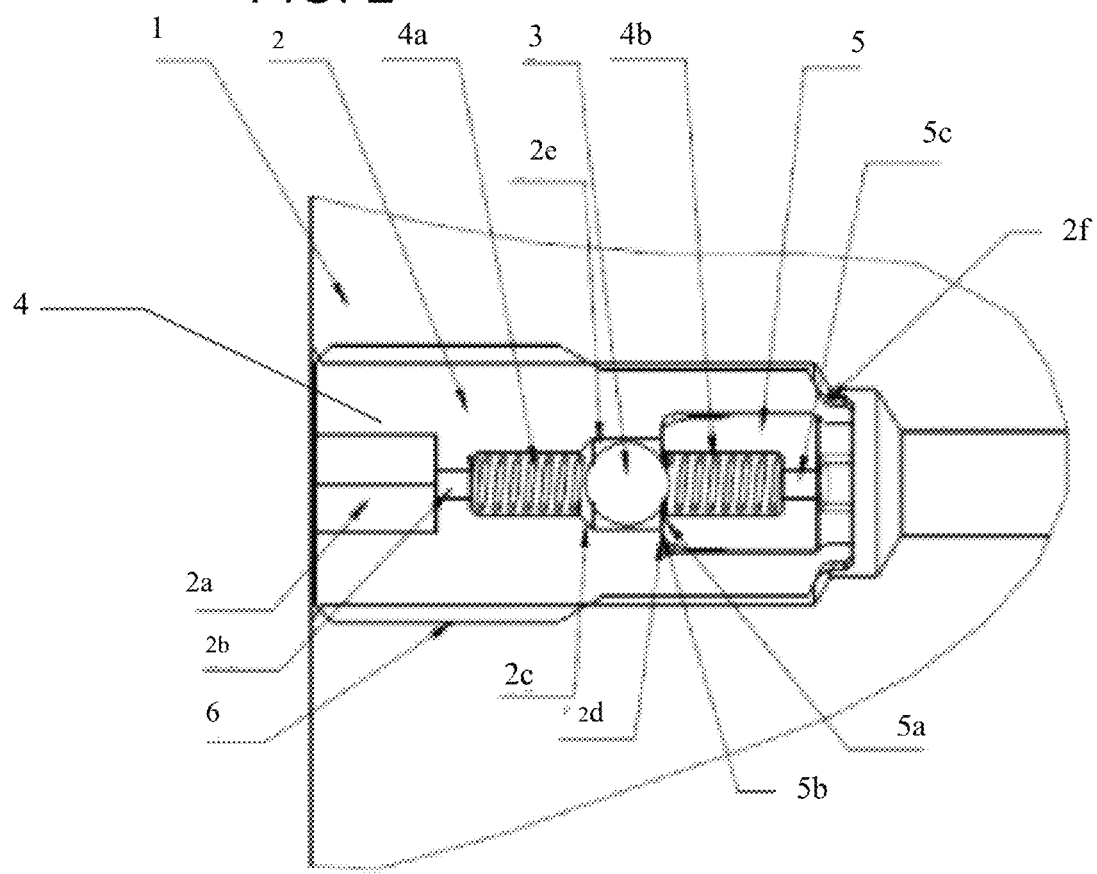

Referring to FIGS. 1-2, an air-discharge brake valve is installed on a steering gear piston 1 by means of a thread 6 (or without a thread). Oil chambers on the left and right sides of the piston 1 are in communication with each other through channels 2b, 2e and 5c of the air-discharge valve.

Referring to FIGS. 1-2, the state shown in the figures is when a vehicle drives straight or oil pressures in the left and right chambers of the piston 1 are balanced. In this case, a spring 4a and a spring 4b are in a compressed state and the pressures are balanced. Due to the balanced oil pressures in the left and right chambers, a steel ball 3 is positioned in the middle, and the steel ball 3 is separated from both a valve body sealing chamfer 2c and a sealing chamfer 5a of the valve seat 5. In this case, the oil chambers at a left end and a right end of the piston are in communication with each other. In a case of a vertically installed steering gear, the left end of the piston is a lower end and the right end thereof is an upper end. Hydraulic oil with dissolved air therein is lighter and tends to rise, that is to say that the hydraulic oil with dissolved air in the left chamber would enter the right chamber through the air-discharge valve. The hydraulic oil in the right chamber is in communication with an oil return line, which would discharge air from the steering gear.

Referring to FIGS. 1-2, when the pressure of the hydraulic oil at the left end of the piston 1 increases (generally when turning left), the hydraulic oil on the left passes through an oil line channel 2b, pushing the steel ball 3 to compress the right spring 4b and move, such that the steel ball 3 is brought into contact with the valve seat sealing chamfer 5a, and thus an air-discharge channel is closed. The hydraulic oil does not pass, which enables the hydraulic oil to effectively push the piston 1 to move to the right, thereby achieving a desired steering action. In this process, the pressure at which the air-discharge channel is closed, which is called a closing pressure of the air-discharge valve, is related to the stiffness of the spring 4b. Therefore, the closing pressure requirements of different customers may be met by adjusting the stiffness of the spring 4b.

Referring to FIGS. 1-2, when the pressure of the hydraulic oil at the right end of the piston 1 increases (generally when turning right), the hydraulic oil on the right passes through an oil line channel 5c, pushing the steel ball 3 to compress the left spring 4a and move, such that the steel ball 3 is brought into contact with the valve body sealing chamfer 2c, and thus the air-discharge channel is closed. The hydraulic oil does not pass, which enables the hydraulic oil to effectively push the piston 1 to move to the left, thereby achieving a desired steering action. In this process, the pressure at which the air-discharge channel is closed is related to the stiffness of the spring 4a, and the closing pressure requirements may be changed by adjusting the stiffness of the spring.

The automatic air-discharge valve according to the present utility model may be have the valve body externally provided with a screwdriver groove 2a to facilitate installation.

Although the present utility model has been described above with reference to the embodiment, various modifications may be made to the present utility model and components thereof may be replaced with equivalents without departing from the scope of the present utility model. In particular, as long as there is no structural conflict, the features disclosed in the embodiments of the present utility model may be combined and used in any way, and these combinations are not exhaustively described in the description only for the sake of omitting space and saving resources. Therefore, the present utility model is not limited to the specific embodiment disclosed herein, and includes all the technical solutions falling within the scope of the claims.

List of references: 1: piston; 2: valve body; 2a: screwdriver groove; 2b: valve body air-discharge hole; 2c: valve body sealing chamfer; 2d: valve body-valve seat mating surface; 2e: steel ball travel channel; 2f: valve body riveting portion; 3: steel ball; 4: pressure regulation spring; 4a: left spring; 4b: right spring; 5: valve seat; 5a: valve seat sealing chamfer; 5b: valve seat-valve body mating surface; 5c: oil line channel; 6: connecting thread.

The invention claimed is:

1. An automatic air-discharge valve, comprising:
a valve body;
a valve seat;
a steel ball; and a pressure regulation spring, wherein the valve body is externally connected to a piston, and the valve body is internally provided with an air-discharge channel capable of accommodating the valve seat, the pressure regulation spring and the steel ball, wherein the valve body is externally provided with a screwdriver groove to facilitate installation of the valve on a steering gear piston wherein the steel ball is capable of being accommodated in a middle of the air-discharge channel of the valve body, wherein the pressure regulation spring comprises a left spring and a right spring arranged on left and right sides of the steel ball, respectively, wherein one end of the left spring is supported by the valve body and the other end thereof is supported by the steel ball, and one end of the right spring is supported by the valve seat, and the other end thereof is supported by the steel ball, and wherein the valve seat is installed at a bottom of the valve body, and a valve seat air-discharge hole is provided in a middle of the valve seat.

2. The automatic air-discharge valve according to claim 1, wherein a surface of the steel ball in contact with a surface arranged at either end of the air-discharge channel is capable of providing a sealing effect.

3. The automatic air-discharge valve according to claim 1, wherein, when there is no pressure difference or a small pressure difference on either side of the steel ball, the steel ball is in the middle of the air-discharge channel of the valve body, and air continues to be discharged.

4. The automatic air-discharge valve according to claim 1, wherein a stiffness of the pressure regulation spring is adjustable to obtain different closed pressures.

5. The automatic air-discharge valve according to claim 1, wherein the valve body is externally provided with a connecting thread.

6. The automatic air-discharge valve according to claim 1, wherein the valve body is fixed to the valve seat.

7. The automatic air-discharge valve according to claim 1, wherein the valve body is capable of discharging air in two directions.

8. The automatic air-discharge valve according to claim 1, wherein;
the valve body further comprises a valve body air-discharge hole, a valve body sealing chamfer, a valve body-valve seat mating surface, and a steel ball travel channel; and
the valve seat further comprises a valve seat sealing chamfer and a valve seat-valve body mating surface which mate with the valve body.

9. An apparatus comprising:
a steering gear piston; and
an automatic air-discharge valve according to claim 1;
wherein the valve body is externally connected to the steering gear piston.

10. A power steering gear for a vehicle comprising:
an apparatus according to claim 9, wherein when there is no pressure difference or a small pressure difference on either side of the steel ball, the steel ball is in the middle of the air-discharge channel of the valve body, and air keeps being discharged.

11. The power steering gear according to claim 10, wherein the power steering gear is installed vertically such that a left end of the steering gear piston is a lower end and a right end thereof is an upper end.

* * * * *